United States Patent
Takeuchi et al.

(10) Patent No.: US 12,385,792 B2
(45) Date of Patent: Aug. 12, 2025

(54) THERMISTOR SINTERED BODY AND TEMPERATURE SENSOR ELEMENT

(71) Applicant: SHIBAURA ELECTRONICS CO., LTD., Saitama (JP)

(72) Inventors: Akitaka Takeuchi, Saitama (JP); Naohiro Niizeki, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 445 days.

(21) Appl. No.: 17/995,934

(22) PCT Filed: Nov. 2, 2020

(86) PCT No.: PCT/JP2020/041048
§ 371 (c)(1),
(2) Date: Oct. 11, 2022

(87) PCT Pub. No.: WO2021/210203
PCT Pub. Date: Oct. 21, 2021

(65) Prior Publication Data
US 2023/0194358 A1 Jun. 22, 2023

(30) Foreign Application Priority Data
Apr. 17, 2020 (JP) .................. 2020-073752

(51) Int. Cl.
*G01K 7/22* (2006.01)
*C04B 35/505* (2006.01)
*H01C 7/00* (2006.01)

(52) U.S. Cl.
CPC .............. *G01K 7/22* (2013.01); *C04B 35/505* (2013.01); *H01C 7/008* (2013.01)

(58) Field of Classification Search
None
See application file for complete search history.

(56) References Cited

U.S. PATENT DOCUMENTS

| 5,051,718 A * | 9/1991 | Satake ............... H01C 7/047 338/34 |
| 2002/0020949 A1 | 2/2002 | Kuzuoka et al. |
| 2019/0348201 A1* | 11/2019 | Takeuchi ............. C04B 35/64 |

FOREIGN PATENT DOCUMENTS

| JP | 2001143907 A | 5/2001 |
| JP | 2013234105 A | 11/2013 |

(Continued)

OTHER PUBLICATIONS

International Search Report for PCT/JP2020/041048 dated Jan. 26, 2021.

(Continued)

*Primary Examiner* — Erica S Lin
(74) *Attorney, Agent, or Firm* — McDonald Hopkins LLC (57) ABSTRACT

Provided is a thermistor sintered body which stably provides a desired B constant even if a composition deviation of an additive element has occurred. The thermistor sintered body-includes a $Y_2O_3$ phase and a $YMnO_3$ phase, wherein a chemical composition of Cr, Mn, Ca and Y excluding oxygen includes Cr: 3 mol % or less (while including 0%), Mn: 5 to 18 mol %, Ca: 1 to 18 mol %, and Sr: 1 to 25 mol %, with the balance being unavoidable impurities and Y. In the thermistor sintered body, Ca and Sr may be dissolved in the $YMnO_3$ phase.

4 Claims, 10 Drawing Sheets

(56) References Cited

FOREIGN PATENT DOCUMENTS

JP       6675050 B      4/2020
WO    WO-2018235432 A1 * 12/2018   ........... C04B 35/505

OTHER PUBLICATIONS

Written Opinion for PCT/JP2020/041048 dated Jan. 26, 2021.
Office Action for JP application No. 2020-073752 dated Jan. 14, 2022.
Decision on Refusal for JP application No. 2020-073752 dated May 23, 2022.

* cited by examiner

1: Y₂O₃ PHASE
2: YCrO₃ PHASE OR YMnO₃ PHASE

| SAMPLE No. | CHEMICAL COMPOSITION [mol%] | | | | | B CONSTANT [K] |
|---|---|---|---|---|---|---|
| | Y | Cr | Mn | Ca | Sr | |
| 1 | 68 | 0 | 16 | 16 | 0 | 2077 |
| 2 | 67 | 0 | 16 | 16 | 1 | 2053 |
| 3 | 65 | 0 | 16 | 16 | 3 | 2017 |
| 4 | 58 | 0 | 16 | 16 | 10 | 2017 |
| 5 | 53 | 0 | 16 | 16 | 15 | 2010 |
| 6 | 48 | 0 | 16 | 16 | 20 | 2081 |

| SAMPLE No. | CHEMICAL COMPOSITION [mol%] | | | | | B CONSTANT [K] |
|---|---|---|---|---|---|---|
| | Y | Cr | Mn | Ca | Sr | |
| 10 | 76 | 1 | 16 | 7 | 0 | 1954 |
| 11 | 75 | 1 | 16 | 7 | 1 | 1945 |
| 12 | 73 | 1 | 16 | 7 | 3 | 1898 |
| 13 | 71 | 1 | 16 | 7 | 5 | 1899 |
| 14 | 66 | 1 | 16 | 7 | 10 | 1899 |
| 15 | 61 | 1 | 16 | 7 | 15 | 1893 |
| 16 | 56 | 1 | 16 | 7 | 20 | 1878 |

| SAMPLE No. | CHEMICAL COMPOSITION [mol%] | | | | | B CONSTANT [K] |
|---|---|---|---|---|---|---|
| | Y | Cr | Mn | Ca | Sr | |
| 20 | 74 | 3 | 16 | 7 | 0 | 2012 |
| 21 | 73 | 3 | 16 | 7 | 1 | 1959 |
| 22 | 71 | 3 | 16 | 7 | 3 | 1869 |
| 23 | 69 | 3 | 16 | 7 | 5 | 1849 |
| 24 | 64 | 3 | 16 | 7 | 10 | 1749 |
| 25 | 59 | 3 | 16 | 7 | 15 | 1748 |
| 26 | 54 | 3 | 16 | 7 | 20 | 1749 |

| SAMPLE No. | CHEMICAL COMPOSITION [mol%] | | | | | B CONSTANT [K] |
|---|---|---|---|---|---|---|
| | Y | Cr | Mn | Ca | Sr | |
| 30 | 78 | 18 | 0 | 4 | 0 | 2116 |
| 31 | 77 | 18 | 0 | 4 | 1 | 1939 |
| 32 | 68 | 18 | 0 | 4 | 10 | 1864 |
| 33 | 66 | 18 | 0 | 4 | 12 | 1863 |
| 34 | 63 | 18 | 0 | 4 | 15 | 2563 |
| 35 | 60 | 18 | 0 | 4 | 18 | 3024 |
| 36 | 58 | 18 | 0 | 4 | 20 | 3246 |

| SAMPLE No. | CHEMICAL COMPOSITION [mol%] | | | | | B CONSTANT [K] |
|---|---|---|---|---|---|---|
| | Y | Cr | Mn | Ca | Sr | |
| 40 | 77 | 18 | 1 | 4 | 0 | 2220 |
| 41 | 76 | 18 | 1 | 4 | 1 | 1648 |
| 42 | 72 | 18 | 1 | 4 | 5 | 1643 |
| 43 | 67 | 18 | 1 | 4 | 10 | 1953 |
| 44 | 62 | 18 | 1 | 4 | 15 | 2614 |

| SAMPLE No. | CHEMICAL COMPOSITION [mol%] | | | | | B CONSTANT [K] |
|---|---|---|---|---|---|---|
| | Y | Cr | Mn | Ca | Sr | |
| 50 | 75 | 18 | 3 | 4 | 0 | 2269 |
| 51 | 74 | 18 | 3 | 4 | 1 | 1722 |
| 52 | 70 | 18 | 3 | 4 | 5 | 1699 |
| 53 | 65 | 18 | 3 | 4 | 10 | 2259 |
| 54 | 60 | 18 | 3 | 4 | 15 | 2735 |

THERMISTOR SINTERED BODY AND TEMPERATURE SENSOR ELEMENT

CROSS-REFERENCE TO RELATED APPLICATIONS

This is the National Stage application of PCT international application PCT/JP2020/041048, filed on Nov. 2, 2020, which claims the priority of Japanese Patent Application No. 2020-073752, filed Apr. 17, 2020, both of which are incorporated herein by reference in their entirety.

TECHNICAL FIELD

The present invention relates to a thermistor sintered body that is used for a temperature sensor, and to a temperature sensor element.

BACKGROUND ART

Conventionally, a temperature sensor has been widely used that uses a thermistor of which the electric resistance value (hereinafter simply referred to as resistance value) changes according to a temperature, as a heat sensitive body. The characteristics of the thermistor are generally shown by the resistance value and a temperature coefficient of resistance (temperature dependence of resistance value). The characteristics of the resistance value of the thermistor are different depending on a material constituting the element, and various materials have been developed which show the characteristics of the resistance value according to the purpose of use.

An average temperature coefficient of resistance (hereinafter referred to as B constant) can be obtained by the following expression;

$$B = (\ln Rm - \ln Rn)/(1/Tm - 1/Tn)$$

Rm: resistance value at temperature Tm Rn: resistance value at temperature Tn

The thermistor detects a temperature on the basis of a change in the resistance value, and, when the resistance value becomes too low, cannot accurately detect the temperature. Accordingly, a thermistor which is used in a wide temperature range is required to have a small B constant. As is disclosed in Patent Literature 1, for example, it is also required of the thermistor that a change in the resistance value due to a heat history or the like is small, in order that the thermistor detects a temperature over a wide temperature range.

CITATION LIST

Patent Literature

Patent Literature 1: JP 2001-143907 A

SUMMARY OF INVENTION

Technical Problem

When a thermistor sintered body is produced, it is prerequisite that the thermistor sintered body provides desired characteristics, in particular, the B constant. One of the premises for obtaining these desired characteristics is that constituent elements of the produced thermistor sintered body match an aimed composition value. However, in an industrial production scale, it cannot be denied that a composition deviation from the aimed composition value occurs.

The present invention, therefore, is directed at providing a thermistor sintered body which stably provides the desired B constant even if the composition deviation of an additive element has occurred. In addition, the present invention is directed at providing a temperature sensor element using such a thermistor sintered body.

Solution to Problem

The present invention provides a sintered body including a $Y_2O_3$ phase and a $YMnO_3$ phase, wherein a chemical composition of Cr, Mn, Ca, Sr and Y excluding oxygen includes Cr: 3 mol % or less (while including 0 mol %), Mn: 5 to 18 mol %, Ca: 1 to 18 mol %, and Sr: 1 to 25 mol %, with the balance being unavoidable impurities and Y, and a variation range of a B constant (value between 25° C. and 50° C.) is 10 [K] or less.

The present invention provides a sintered body including a $Y_2O_3$ phase and a $YCrO_3$ phase, wherein a chemical composition of Cr, Mn, Ca, Sr and Y excluding oxygen includes Cr: 5 to 20 mol %, Mn: less than 3 mol % (while including 0 mol %), Ca: 1 to 18 mol %, and Sr: 1 to 25 mol %, with the balance being unavoidable impurities and Y, and a variation range of a B constant (value between 25° C. and 50° C.) is 25 [K] or less.

In the thermistor sintered body of the present invention, Ca and Sr are preferably dissolved in the $YMnO_3$ phase or the $YCrO_3$ phase.

The present invention provides a temperature sensor element that includes: a heat sensitive body; a pair of lead wires configured to be electrically connected to the heat sensitive body; and a protective layer configured to cover the heat sensitive body. In the temperature sensor element of the present invention, the thermistor sintered body described above is used as the heat sensitive body.

Advantageous Effect of Invention

According to the present invention, a thermistor sintered body can be obtained that has a desired B constant even if the composition deviation has occurred, due to a combined addition of Ca and Sr.

DESCRIPTION OF EMBODIMENTS

Hereinafter, embodiments of the present invention will be described with reference to the accompanying drawings.

Figure 1:
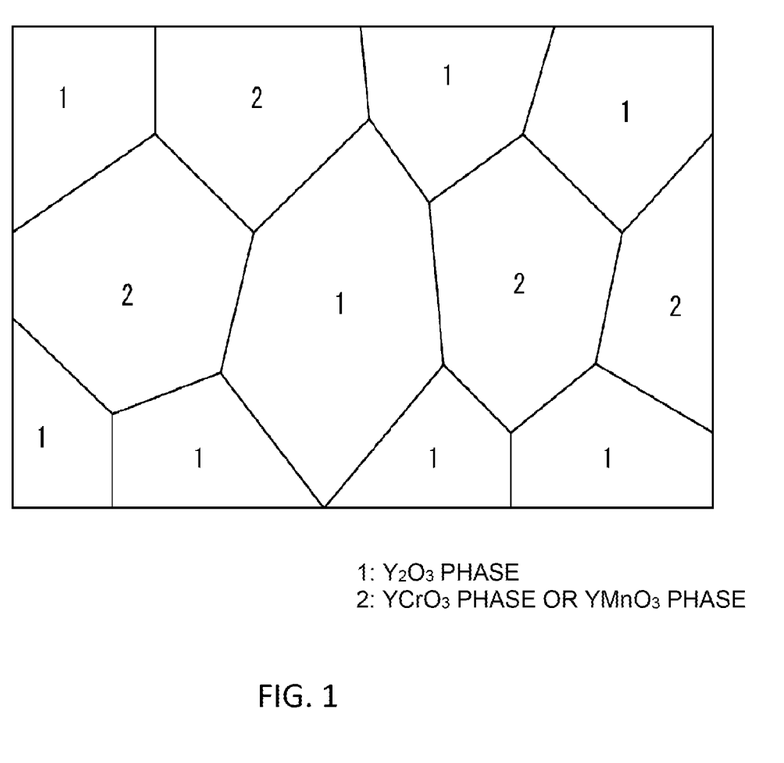
FIG. 1A is a figure schematically showing a structure of a thermistor sintered body according to an embodiment of the present invention.

As is shown in FIG. 1, a thermistor sintered body according to the present embodiment is an oxide sintered body formed of a composite structure that includes a $Y_2O_3$ phase, and a $YCrO_3$ phase or a $YMnO_3$ phase.

The $Y_2O_3$ phase has a property of an electrical insulator, and gives an influence on a resistance value of the thermistor sintered body. In addition, the $YCrO_3$ phase or the $YMnO_3$ phase has a property of a semiconductor and gives an influence on a B constant of the thermistor sintered body.

The thermistor sintered body according to the present embodiment has a structure that has the $Y_2O_3$ phase of which the resistance value and the B constant are high, and the $YCrO_3$ phase or $YMnO_3$ phase of which the resistance value and the B constant are low. In the thermistor sintered body, the $Y_2O_3$ phase constitutes more than the $YCrO_3$ phase or $YMnO_3$ phase; and the $Y_2O_3$ phase constitutes more than 50 vol % to 90 vol %, and the $YCrO_3$ phase or $YMnO_3$ phase constitutes the balance (10 vol % to less than 50 vol %).

The thermistor sintered body according to the present embodiment typically forms a sea-island structure, and forms a composite structure in which the $YCrO_3$ phase or $YMnO_3$ phase forming a subphase is dispersed in the $Y_2O_3$ phase forming a main phase. In the thermistor sintered body, the $Y_2O_3$ phase preferably constitutes 60 to 90 vol % thereof, and more preferably constitutes 65 to 75 vol % thereof.

When the thermistor sintered body according to the present embodiment forms the sea-island structure, there is a case where the grain boundaries cannot be clearly identified, but the $Y_2O_3$ phase has an average grain size (d50) of approximately 0.5 to 30 μm, and the $YCrO_3$ phase or $YMnO_3$ phase has an average grain size of approximately 1.0 to 10 μm.

In the thermistor sintered body according to the present embodiment, Ca and Sr are dissolved in the $YCrO_3$ phase or the $YMnO_3$ phase. Ca and Sr are dissolved in the $YCrO_3$ phase or the $YMnO_3$ phase, and thereby the B constant of the $YCrO_3$ phase or $YMnO_3$ phase becomes stable. In particular, in the thermistor sintered body according to the present embodiment, the B constant at room temperature becomes stable.

The thermistor sintered body according to the present invention includes a first configuration including the $YMnO_3$ phase and a second configuration including the $YCrO_3$ phase.

A thermistor sintered body according to the first configuration includes the $Y_2O_3$ phase and the $YMnO_3$ phase, wherein a chemical composition of Cr, Mn, Ca, Sr and Y excluding oxygen includes Cr: 3 mol % or less (while including 0 mol %), Mn: 5 to 18 mol %, Ca: 1 to 18 mol %, and Sr: 1 to 25 mol %, with the balance being unavoidable impurities and Y. A thermistor sintered body according to the second configuration includes the $Y_2O_3$ phase and the $YCrO_3$ phase, wherein a chemical composition of Cr, Mn, Ca, Sr and Y excluding oxygen includes Cr: 5 to 20 mol %, Mn: 3 mol % or less (while including 0 mol %), Ca: 1 to 18 mol %, and Sr: 1 to 25 mol %, with the balance being unavoidable impurities and Y. The thermistor sintered body according to the first configuration and the second configuration has features in that the thermistor sintered body contains Ca and Sr in combination.

In the thermistor sintered body according to the present embodiment, Ca and Sr are dissolved in the $YMnO_3$ phase in the first configuration, and Ca and Sr are dissolved in the $YCrO_3$ phase in the second configuration. Ca and Sr have a function of stabilizing the B constant of the thermistor sintered body by being dissolved in the $YMnO_3$ phase or the $YCrO_3$ phase.

[Method for Producing Thermistor Sintered Body]

Next, one example of a method for producing a thermistor sintered body according to the present embodiment will be described with reference to FIG. 2.

Figure 2:
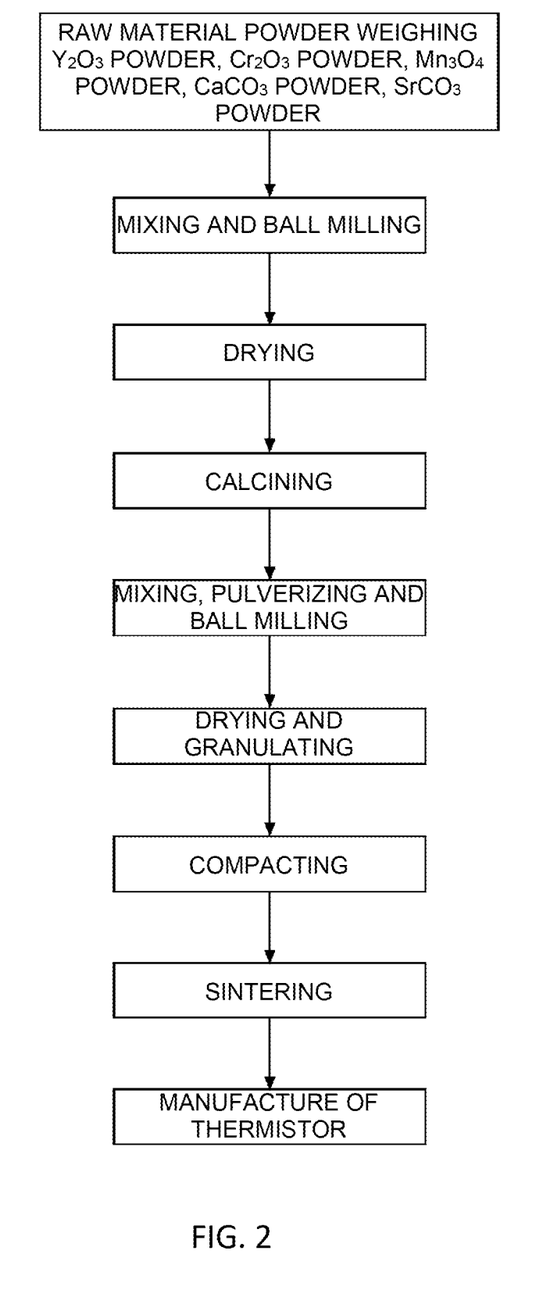
FIG. 2 is a flowchart showing one example of a production procedure of the thermistor sintered body according to the present embodiment.

As is shown in FIG. 2, the production method in the present embodiment includes steps of: weighing raw material powders; mixing the raw material powders; drying the raw material powders; calcining; mixing/pulverizing after calcining; drying/granulating; compacting; and sintering. Hereinafter, each of the steps will be sequentially described.

[Weighing of Raw Material Powder]

In the present embodiment, the raw material powders shall be yttrium oxide ($Y_2O_3$) powder, chromium oxide ($Cr_2O_3$) powder, manganese oxide (MnO, $Mn_2O_3$, $Mn_3O_4$ and the like) powder, $CaCO_3$ powder and $SrCO_3$ powder.

The above raw material powders are weighed so as to form the above described chemical composition.

The $Y_2O_3$ powder contributes to the formation of the $Y_2O_3$ phase, and the $Y_2O_3$ powder, the $Cr_2O_3$ powder and the $Mn_3O_4$ powder contribute to the formation of the $YCrO_3$ phase or the $YMnO_3$ phase. The $CaCO_3$ powder and the $SrCO_3$ powder function as a sintering aid, and in addition, contribute to stabilizing the B constant by being dissolved in the $YCrO_3$ phase or the $YMnO_3$ phase in forms of Ca and Sr.

The raw material powder has a purity of 98% or more, preferably 99% or more, more preferably 99.9% or more, in order to obtain a thermistor sintered body having high characteristics.

The particle size of the raw material powder is not limited as long as the calcining proceeds, but can be selected in a range of 0.1 to 6.0 μm by an average particle size (d50).

[Mixing of Raw Material Powder and Ball Milling]

Predetermined amounts of the $Y_2O_3$ powder, the $Cr_2O_3$ powder, the $Mn_3O_4$ powder, the $CaCO_3$ powder and the $SrCO_3$ powder are weighed, and are mixed. The mixing can be performed, for example, by a procedure of converting the mixed powder into a slurry state by addition of water, and mixing the slurry by a ball mill. For the mixing, a mixer other than a ball mill can also be used.

[Drying of Raw Material Powder]

It is preferable to dry and granulate the slurry after the mixture, with a spray dryer or other equipment, and to form a mixed powder for calcination.

[Calcination]

The mixed powder for calcination after drying is calcined. With the calcination, a calcined body which has a composite structure of the $Y_2O_3$ phase and the $YCrO_3$ phase or $YMnO_3$ phase is obtained from the $Y_2O_3$ powder, the $Cr_2O_3$ powder, the $Mn_3O_4$ powder, the $CaCO_3$ powder and the $SrCO_3$ powder.

The calcination is performed by a procedure of, for example, charging the mixed powder for calcination into a crucible, and holding the mixed powder in a temperature range of 800 to 1300° C. in the air. If the calcining temperature is lower than 800° C., the formation of the composite structure is insufficient, and if the calcining temperature exceeds 1300° C., there is a possibility that the sintering density decreases and the stability of the resistance value decreases. For this reason, the holding temperature for calcination is set in a range of 800 to 1300° C.

The holding time period in the calcination should be appropriately set according to the holding temperature, but when the holding temperature is in the above temperature range, the purpose of the calcination can be achieved by a holding time period of approximately 0.5 to 100 hours.

[Mixing, Pulverization and Ball Milling]

The powder after calcination is mixed and pulverized. The mixing and pulverizing can be performed by a procedure of converting the powder after calcination into a slurry state by addition of water, and mixing the slurry by a ball mill, in the same manner as in the procedure before calcining.

Here, the $YCrO_3$ phase or $YMnO_3$ phase and the $Y_2O_3$ phase are formed in the powder after calcining, and Ca is dissolved in the $YCrO_3$ phase or the $YMnO_3$ phase. The $YCrO_3$ phase or $YMnO_3$ phase in which Ca is dissolved resists reacting with water, and accordingly, water can be used in the subsequent drying/granulating step and compacting step.

[Drying and Granulation]

It is preferable to dry and granulate the powder after the pulverization, by a spray dryer or other equipment.

[Compaction]

The granulated powder after calcining is compacted into a predetermined shape.

For compacting, press compacting with the use of a die, and besides a cold isostatic press (Cold Isostatic Press: CIP) can be used.

The higher the density of the compacted body is, the easier it is to obtain a sintered body of higher density; and accordingly, the density of the compacted body should be as high as possible. For that purpose, it is preferable to use CIP with which the high density can be obtained.

[Sintering]

Next, the obtained compacted body is sintered.

The sintering is performed by a procedure of holding the temperature range of 1400 to 1650° C. in the air. If the sintering temperature is lower than 1400° C., the formation of the composite structure is insufficient; and if the sintering temperature exceeds 1650° C., the sintered body melts, and/or a reaction occurs with a sintering crucible and/or the like. The holding time period in the sintering should be appropriately set according to the holding temperature, but when the holding temperature is in the above temperature range, a dense sintered body can be obtained by a holding time period of approximately 0.5 to 200 hours.

It is preferable to subject the obtained thermistor sintered body to annealing, in order to stabilize the characteristics of the thermistor. The thermistor sintered body is annealed by being held, for example, at 1000° C. in the air.

[Temperature Sensor Element]

A specific example of a temperature sensor element 10 will be described to which the thermistor sintered body obtained in the above manner is applied.

Figure 3A:
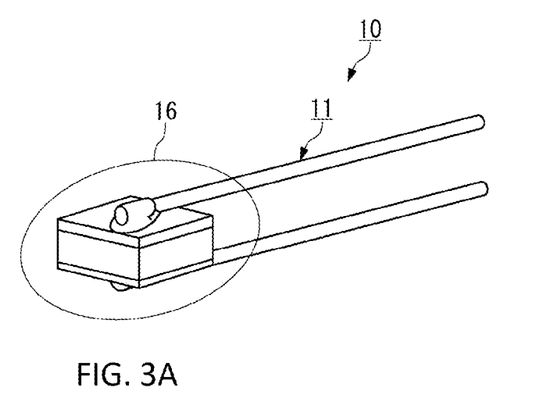
FIG. 3A and FIG. 3B are each a perspective view showing one example of a temperature sensor element that uses the thermistor sintered body according to the present embodiment.

The temperature sensor element 10 includes an element body 11 and a covering layer 16, as is shown in FIG. 3A.

The element body 11 is used together with a detection circuit for extracting a change in resistance value as a voltage change, and thereby detects a temperature of an environment in which the element body 11 is placed, and generates a temperature detection signal formed of an electrical signal.

The covering layer 16 seals the main part of the element body 11 to keep the element body 11 in an airtight state, thereby suppresses occurrence of, in particular, chemical and physical changes of the thermistor sintered body on the basis of the environmental conditions, and also mechanically protects the element body 11.

Figure 3B:
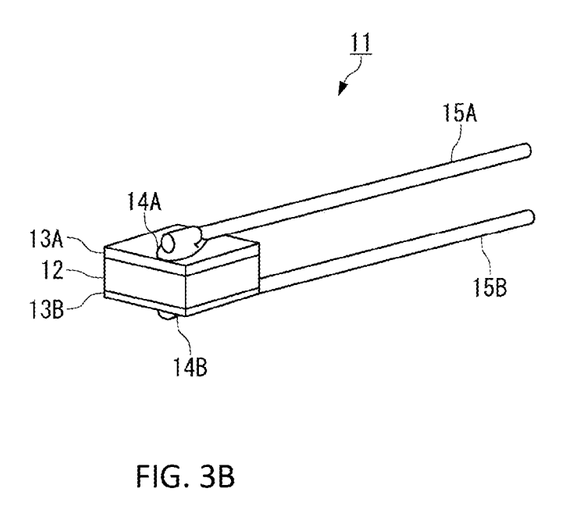

As is shown in FIG. 3B, the element body 11 in this example includes: a heat sensitive body 12 formed of a tabular thermistor sintered body; electrodes 13A and 13B; connection electrodes 14A and 14B; and lead wires 15A and 15B.

The electrodes 13A and 13B are each formed into a film shape on the whole area of both of top and bottom surfaces of the plate-like thermistor sintered body. The electrodes 13A and 13B are formed from platinum (Pt) or another noble metal.

The electrodes 13A and 13B are formed as a thick film or a thin film. The thick film electrodes 13A and 13B are formed by applying a paste which has been produced by mixing an organic binder with a platinum powder, onto both of the top and bottom surfaces of the thermistor sintered body, and by drying and then sintering the paste. On the other hand, the thin film electrode can be formed by vacuum vapor deposition or sputtering.

The thermistor sintered body on which the electrodes 13A and 13B have been formed is worked into a predetermined dimension.

The connection electrodes 14A and 14B are formed of metal films which are formed on the surfaces of the electrodes 13A and 13B, respectively. The connection electrodes 14A and 14B are also formed from platinum (Pt) or another noble metal.

One end sides of the lead wires 15A and 15B are electrically and mechanically connected to the electrodes 13A and 13B via the connection electrodes 14A and 14B, respectively. The other end sides of the lead wires 15A and 15B are connected to an external detection circuit.

The lead wires 15A and 15B are formed of a wire material which has heat resistance and is formed from, for example, platinum or an alloy of platinum and iridium (Ir).

The lead wires 15A and 15B are connected to the electrodes 13A and 13B, in the following manner.

A paste containing a platinum powder which will form the connection electrodes 14A and 14B is applied to each of one end sides of the lead wires 15A and 15B in advance. The platinum paste is dried in a state in which the respective sides of the lead wires 15A and 15B, on which the platinum paste has been applied, are brought into contact with the electrodes 13A and 13B, and then the platinum powder is sintered.

For the covering layer 16 shown in FIG. 3A, a glass can be used which contains, for one example, $SiO_2$, CaO, SrO, BaO, $Al_2O_3$ and $SnO_2$ as the raw materials. By such glass, the element body 11 and the one end sides of the lead wires 15A and 15B are sealed.

A method for sealing the heat sensitive body 12 and the like by the covering layer 16 can be arbitrarily selected; but it is possible to seal the thermistor sintered body and the like by covering the thermistor sintered body and the like with, for example, a glass tube which is made from glass and becomes the covering layer 16, and then by melting the glass tube.

It is preferable that the temperature sensor element 10 is subjected to annealing treatment, after having been sealed by glass and cooled. Due to this annealing treatment, it becomes possible to prevent the resistance of the element body 11 from decreasing.

Next, another embodiment of the temperature sensor element 20 will be described with reference to FIGS. 4A and 4B.

Figure 4A:
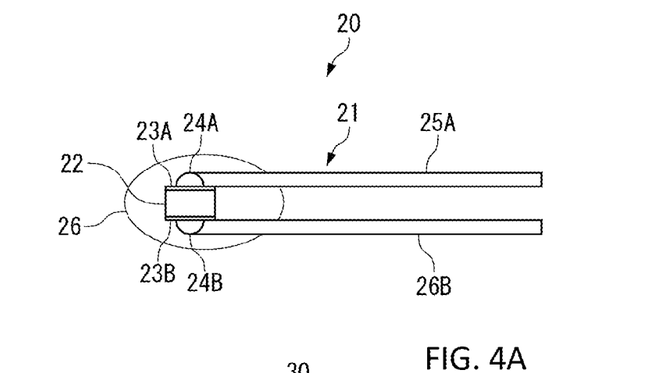
FIG. 4A is a perspective view showing another example of a temperature sensor element that uses the thermistor sintered body according to the present embodiment.

The temperature sensor element 20 includes an element body 21 and a covering layer 26, and is similar in appearance to the temperature sensor element 10, as is shown in FIG. 4A. The element body 21 and the covering layer 26 have the same functions as the element body 11 and the covering layer 16 of the temperature sensor element 10, respectively.

As is shown in FIG. 4A, the element body 21 in this example includes: a tabular thermistor sintered body; electrodes 23A and 23B; connection electrodes 24A and 24B; and lead wires 25A and 25B.

The element body 21 has features in portions of the thermistor sintered body and the electrodes 23A and 23B, as compared with the element body 11. As is shown in the middle stage of FIG. 4B, in the element body 21, the thermistor sintered body and the electrodes 23A and 23B constitute a thermistor chip 33. The thermistor chip 33 is manufactured in the following manner.

Into the previously described pulverized calcined powder, for example, an ethyl cellulose-based binder is mixed, and the mixture is compacted into a sheet shape. The conditions of the calcination are as previously described.

Next, a predetermined dimension of the sheet is punched from the compacted sheet, and is sintered. The conditions of the sintering are as previously described. Then, a wafer obtained by sintering is polished, and a wafer 31 is obtained which is formed of a thermistor sintered body with a predetermined thickness, as is shown in the upper stage of FIG. 4B. After that, a paste for forming an electrode is applied to both of the top and bottom surfaces of the polished wafer 31 (thermistor sintered body) by printing, and then sintered; and a wafer 30 is obtained on which electrode films have been formed. An electro-conductive material to be contained in the paste is selected from platinum (Pt) and other noble metals. When the platinum has been selected, the sintering is performed at approximately 1300° C. After that, the wafer 30 is cut so as to become a predetermined dimension, as is shown in the middle stage of FIG. 4B, and thereby the thermistor chip 33 is obtained which has the film-like electrodes 23A and 23B formed on the top and bottom surfaces, respectively.

Figure 4B:
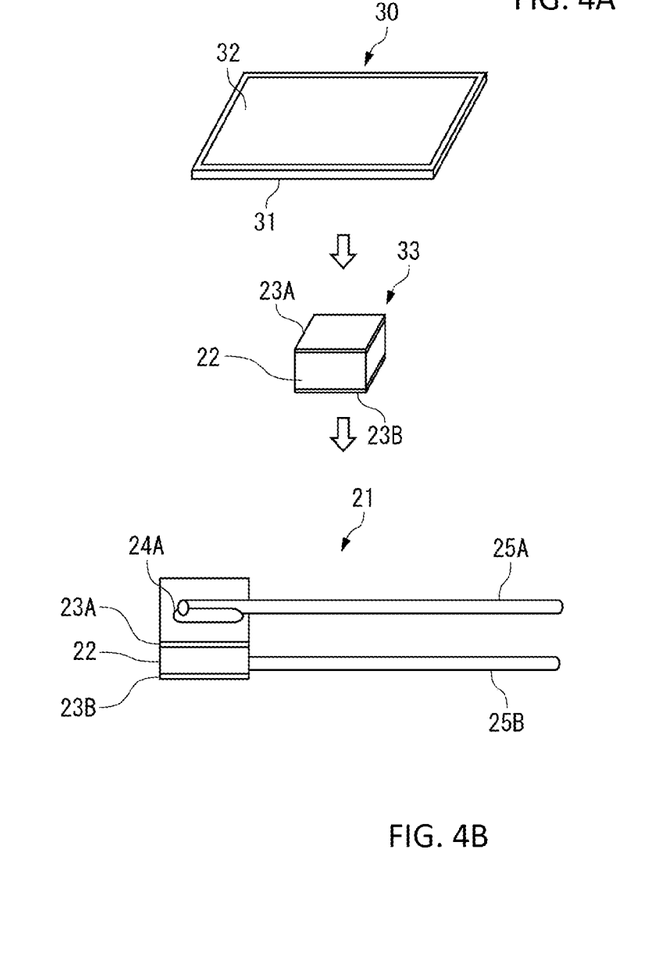
FIG. 4B is a figure showing the outline of the production procedure.

Next, the lead wires 25A and 25B are joined on to the electrodes 23A and 23B on both of the top and bottom surfaces of the thermistor sintered body, respectively, with the use of a Pt paste, then the resultant thermistor sintered body is subjected to baking treatment to have the connection electrodes 24A and 24B formed thereon, and the element body 21 shown in the lower stage of FIG. 4B is manufactured.

Next, the covering layer 26 is formed; and for the covering layer 26, the previously described glass can be used, or a covering material can also be used which is formed of a constituent material similar to the thermistor sintered body. In other words, the covering layer of the thermistor sintered body in the present invention can be arbitrarily selected as long as the purpose can be achieved.

First Example: $YMnO_3$

Next, the thermistor sintered body of the present invention will be described on the basis of the first Example.

Figure 5A:
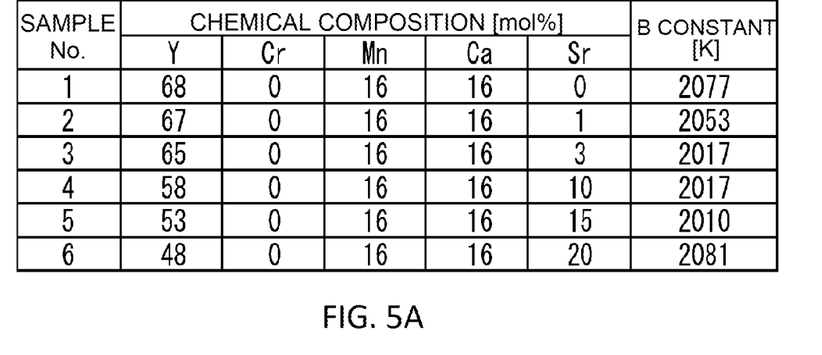
FIG. 5A is a table showing measurement results of a chemical composition and a B constant in a first Example.
Figure 6A:
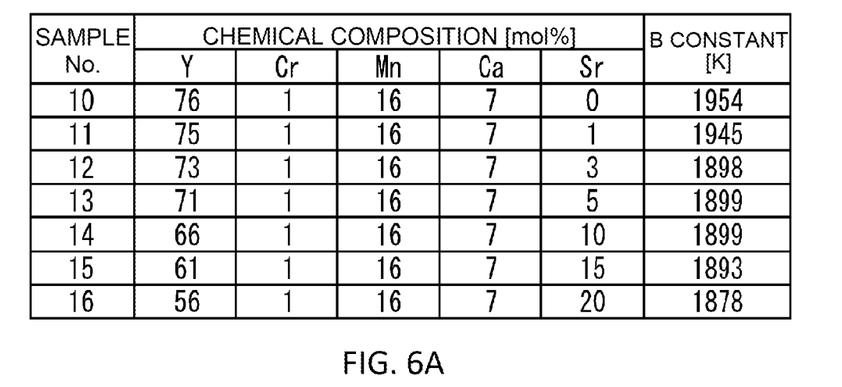
FIG. 6A is a table showing measurement results of the chemical composition and the B constant in the first Example.
Figure 7A:
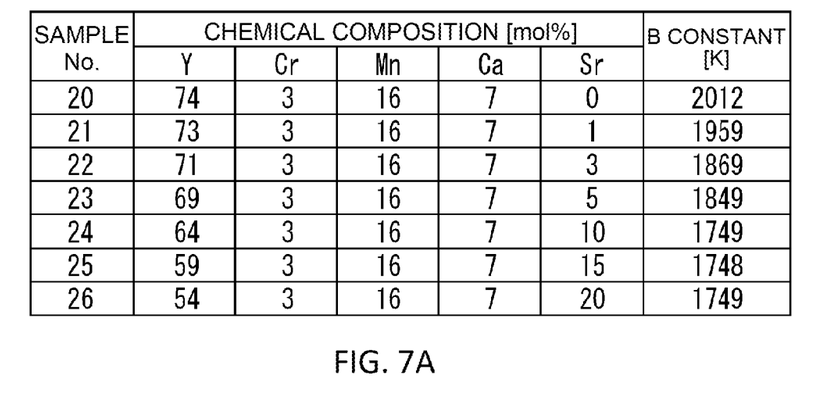
FIG. 7A is a table showing measurement results of the chemical composition and the B constant in the first Example.

Raw material powders having the following average particle sizes were prepared, and thermistor sintered bodies having various compositions shown in FIGS. 5A, 6A and FIG. 7A were produced according to the above described production steps. FIG. 5A shows sintered bodies containing no Cr, FIG. 6A shows sintered bodies containing 1 mol % of Cr, and FIG. 7A shows sintered bodies containing 3 mol % of Cr. In the tables of FIGS. 5A, 6B and 7A, Nos. 1, 10 and 20 are samples that contain Ca but do not contain Sr. In addition, in the tables of FIGS. 5A, 6A and 7A, Nos. 2 to 6 (FIG. 5A), Nos. 11 to 16 (FIG. 6A), and Nos. 21 to 26 (FIG. 7A) are samples that contain Ca and Sr. Note that the amounts of the respective elements in FIGS. 5A, 6A and FIG. 7A are weighed values, and the same applies to the second Example.

The calcination in the process of obtaining the sintered body was performed under conditions of 1000° C. for 24 hours, and the sintering was performed under conditions of 1500° C. for 24 hours, both in the air.

Figure 5B:
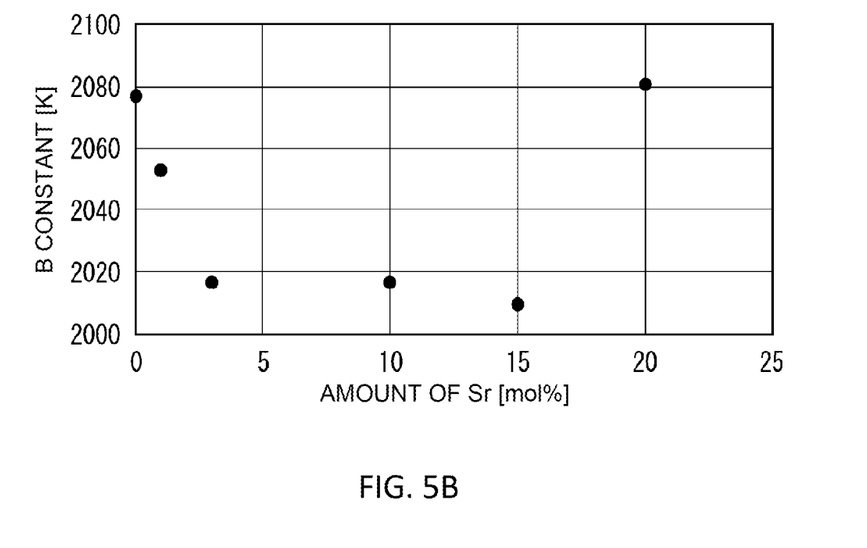
FIG. 5B is a graph showing a relationship between a content of Sr and the B constant.
Figure 6B:
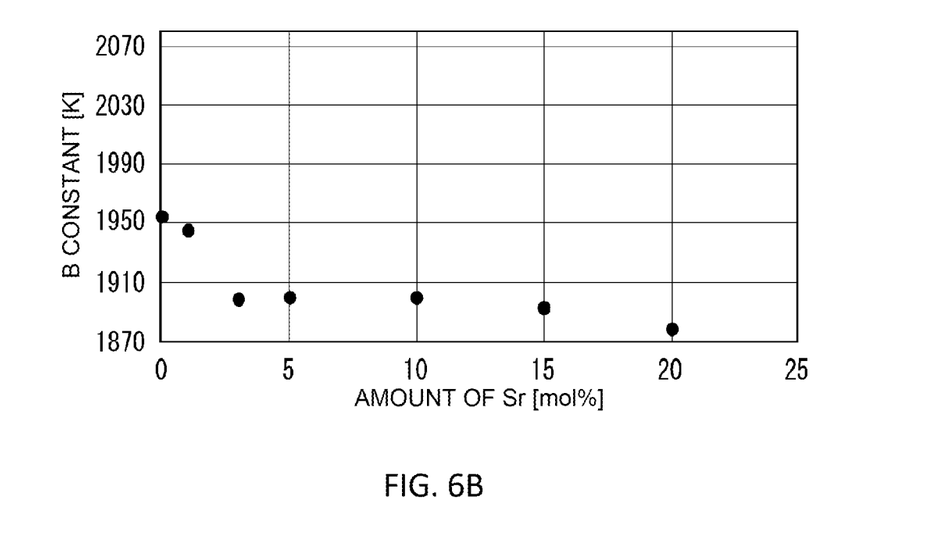
FIG. 6B is a graph showing the relationship between the content of Sr and a B constant.
Figure 7B:
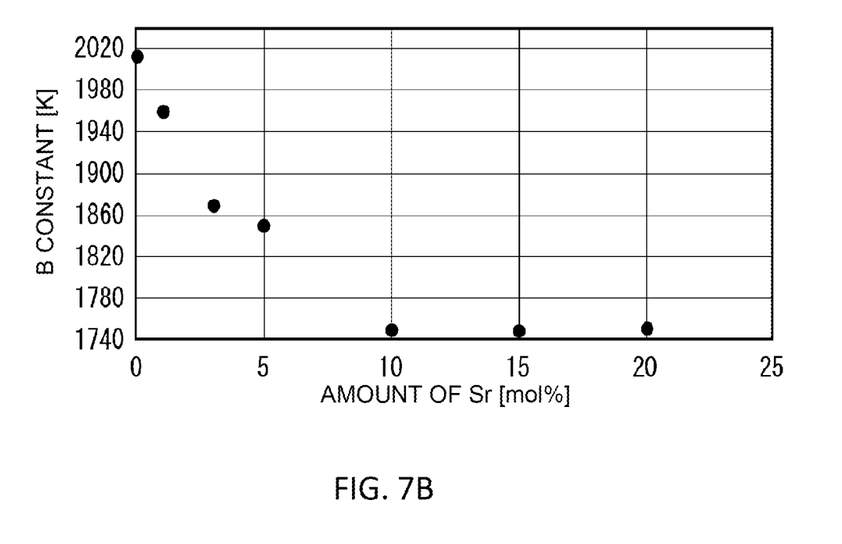
FIG. 7B is a graph showing the relationship between the content of Sr and the B constant.

$Y_2O_3$ powder: 0.1 μm $Cr_2O_3$ powder: 2.0 μm $Mn_3O_4$ powder: 5.0 μm $CaCO_3$ powder: 2.0 μm $SrCO_3$ powder: 2.0 μm The B constant was determined for each of the obtained sintered bodies. The results are shown in FIGS. 5B, 6B and 7B. Note that the B constant shows values between 25° C. and 50° C. (B25/50).

As shown in FIGS. 5A and 5B, the sintered bodies do not contain Cr, but the variation range of the B constant is 10 [K] or less, in a range in which an amount of Sr is 3 to 15 mol %. In addition, as shown in FIGS. 6A and 6B, also in the sintered bodies in which the content of Cr is 1 mol %, the variation range of the B constant is 10 [K] or less, and particularly is 7 [K] or less, in a range in which an amount of Sr is 3 to 15 mol %. Furthermore, as shown in FIGS. 7A and 7B, in the sintered bodies in which the content of Cr is 3 mol %, the variation range of the B constant is 10 [K] or less, and particularly is 3 [K] or less, in a range in which the amount of Sr is 10 to 20 mol %.

As described above, when Ca and Sr are added in combination, the B constant becomes stable in a range in which Sr is 3 to 20 mol %, though the B constant varies depending on the content of Cr. Accordingly, even if the composition deviation has occurred, the desired characteristic can be easily obtained, as long as in the range.

Here, in the present embodiment, in addition to the $Y_2O_3$ phase and the $YCrO_3$ phase or $YMnO_3$ phase, the $SrCrO_3$ phase and the $SrMnO_3$ phase are generated as a third phase, in some cases. The $SrCrO_3$ phase is formed in a portion in which synthesis has been insufficient during calcining, and the $SrMnO_3$ phase is formed in a composition which contains a large amount of Sr. Among the third phases, the $SrCrO_3$ phase reacts with water and is eluted. This elution becomes a factor of the composition deviation, but according to the present invention, even if the composition deviation has occurred, the desired characteristic can be easily obtained.

Example 2: YCrO₃

Next, the thermistor sintered body of the present invention will be described on the basis of the second Example.

Figure 8A:
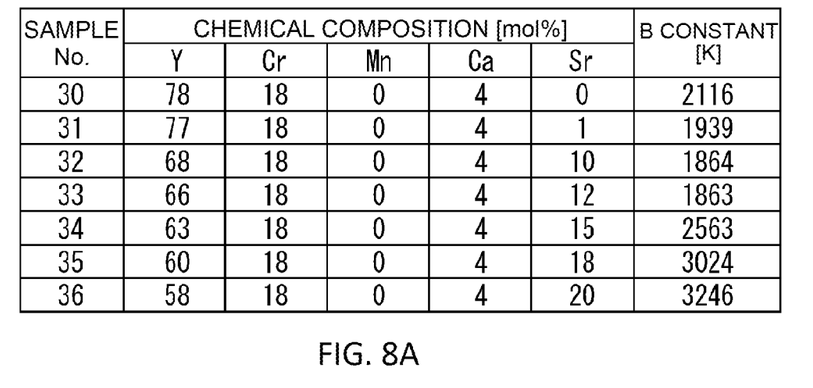
FIG. 8A is a table showing measurement results of a chemical composition and the B constant in a second Example.
Figure 9A:
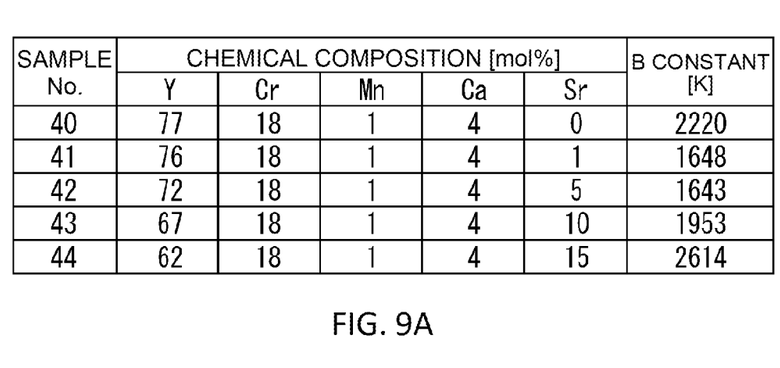
FIG. 9A is a table showing measurement results of the chemical composition and the B constant in the second Example.
Figure 10A:
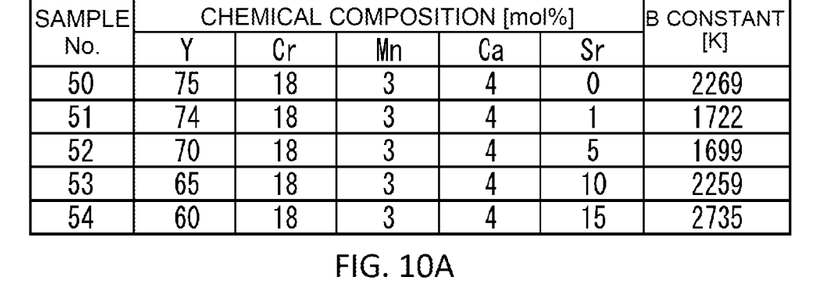
FIG. 10A is a table showing measurement results of the chemical composition and the B constant in the second Example.

Thermistor sintered bodies having compositions shown in FIG. 8A, FIG. 9A and FIG. 10A were produced by similar raw materials and similar procedures to those in the first Example. FIG. 8A shows sintered bodies containing no Mn, FIG. 9A shows sintered bodies containing 1 mol % of Mn, and FIG. 10A shows sintered bodies containing 3 mol % of Mn. In the tables of FIGS. 8A, 9A and 10A, Nos. 30, 40 and 50 are samples that contain Ca but do not contain Sr. In addition, in the tables of FIGS. 8A, 9A and 10A, Nos. 31 to 36 (FIG. 8A), Nos. 41 to 44 (FIG. 9A), and Nos. 51 to 54 (FIG. 10A) are samples that contain Ca and Sr.

Figure 8B:
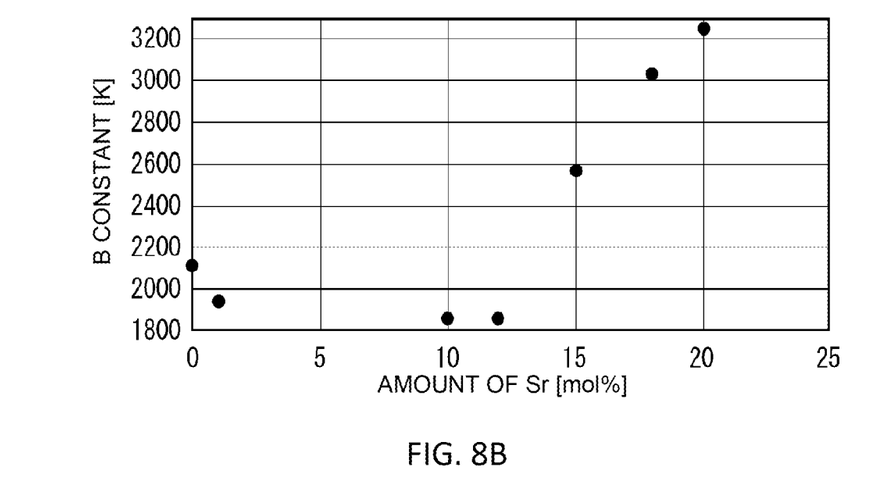
FIG. 8B is a graph showing the relationship between the content of Sr and the B constant.
Figure 9B:
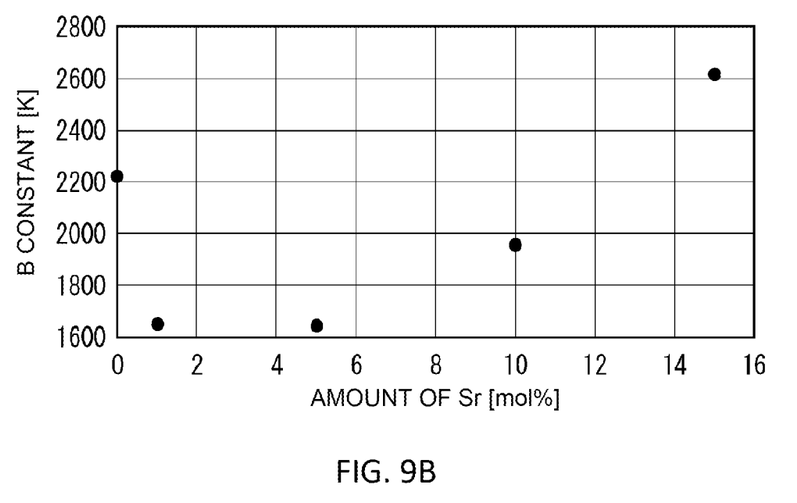
FIG. 9B is a graph showing the relationship between the content of Sr and the B constant.
Figure 10B:
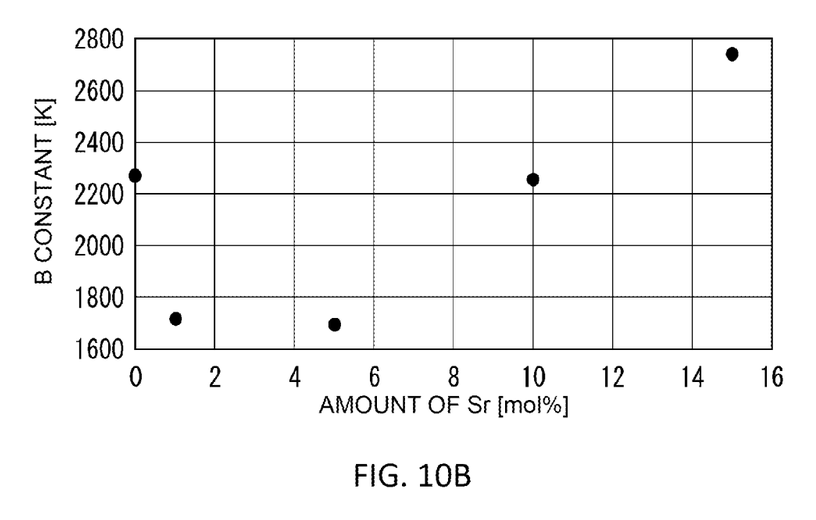
FIG. 10B is a graph showing the relationship between the content of Sr and the B constant.

The B constant was determined for each of the obtained sintered bodies. The results are shown in FIGS. 8B, 9B and FIG. 10B. Note that the B constant shows values between 25° C. and 50° C. (B25/50), as in the first Example.

As shown in FIG. 8B, in the sintered body containing no Mn, the variation range of the B constant is 10 [K] or less, and particularly is 3 [K] or less, in a range in which the amount of Sr is 10 to 12 mol %. In addition, as shown in FIG. 9B, in the sintered bodies in which the content of Mn is 1 mol %, the variation range of the B constant is 10 [K] or less, and particularly is 5 [K] or less, in a range in which the amount of Sr is 1 to 5 mol %. Furthermore, as shown in FIG. 10B, in the sintered bodies in which the content of Mn is 3 mol %, the variation range of the B constant is 25 [K] or less, in a range in which the amount of Sr is 1 to 5 mol %.

As described above, when Ca and Sr are added in combination, the B constant becomes stable in a range in which Sr is 1 to 12 mol %, though the B constant varies depending on the content of Cr. Accordingly, even if the composition deviation has occurred, the desired characteristic can be easily obtained, as long as in the range.

The present invention has been described above on the basis of the preferred embodiments and Examples, but the configurations included in the above described embodiments can be selected, or be appropriately changed to other configurations, insofar as they do not deviate from the scope of the invention.

In addition, it is preferable that the thermistor sintered body of the present invention is formed of only a crystal structure of the orthorhombic crystal system, but it is not excluded that a crystal structure of the hexagonal crystal system exists. As long as the characteristics of the present invention can be obtained, even when a trace amount of the crystal structure of the hexagonal crystal system is included in the crystal structure of the orthorhombic crystal system, the thermistor sintered body corresponds to the thermistor sintered body of the present invention.

In addition, the thermistor sintered body of the present invention includes the Y₂O₃ phase and the YCrO₃ phase or YMnO₃ phase, but allows the existence of another phase (third phase). The above described SrCrO₃ and SrMnO₃ are listed as the third phase, and the thermistor sintered body of the present invention can enjoy an effect that the B constant becomes stable, even if having contained these third phases.

REFERENCE SIGNS LIST

1 Y₂O₃ phase
2 YCrO₃ phase or YMnO₃ phase
10 and 20 temperature sensor element
11 and 21 element body
13A, 13B, 23A and 23B electrode
14A, 14B, 24A and 24B connection electrode
15A, 15B, 25A and 25B lead wire
16 and 26 covering layer
31 wafer
33 thermistor chip

The invention claimed is:
1. A thermistor sintered body comprising a $Y_2O_3$ phase and a $YMnO_3$ phase, wherein:
   a chemical composition of Cr, Mn, Ca, Sr and Y excluding oxygen comprises Cr: 0 to 3 mol %, Mn: 5 to 18 mol %, Ca: 1 to 18 mol %, and Sr: 1 to 25 mol %, with the balance being unavoidable impurities and Y,
   Ca and Sr are dissolved in the $YMnO_3$ phase, and
   a range of B constant values for temperatures between 25° C. and 50° C. for all elemental mol % combinations of the chemical composition is 10 K or less.
2. A thermistor sintered body comprising a $Y_2O_3$ phase and a $YCrO_3$ phase, wherein:
   a chemical composition of Cr, Mn, Ca, Sr and Y excluding oxygen comprises Cr: 5 to 20 mol %, Mn: 0 to 3 mol %, Ca: 1 to 18 mol %, and Sr: 1 to 25 mol %, with the balance being unavoidable impurities and Y,
   Ca and Sr are dissolved in the $YCrO_3$ phase, and
   a range of B constant values for temperatures between 25° C. and 50° C. for all elemental mol % combinations of the chemical composition is 25 K or less.
3. A temperature sensor element comprising: a heat sensitive body; and
   a pair of lead wires configured to be electrically connected to the heat sensitive body;
   a protective layer configured to cover the heat sensitive body,
   wherein the heat sensitive body comprises the thermistor sintered body according to claim 1.
4. A temperature sensor element comprising:
   a heat sensitive body;
   a pair of lead wires configured to be electrically connected to the heat sensitive body; and
   a protective layer configured to cover the heat sensitive body,
   wherein the heat sensitive body comprises the thermistor sintered body according to claim 2.

* * * * *